UNITED STATES PATENT OFFICE.

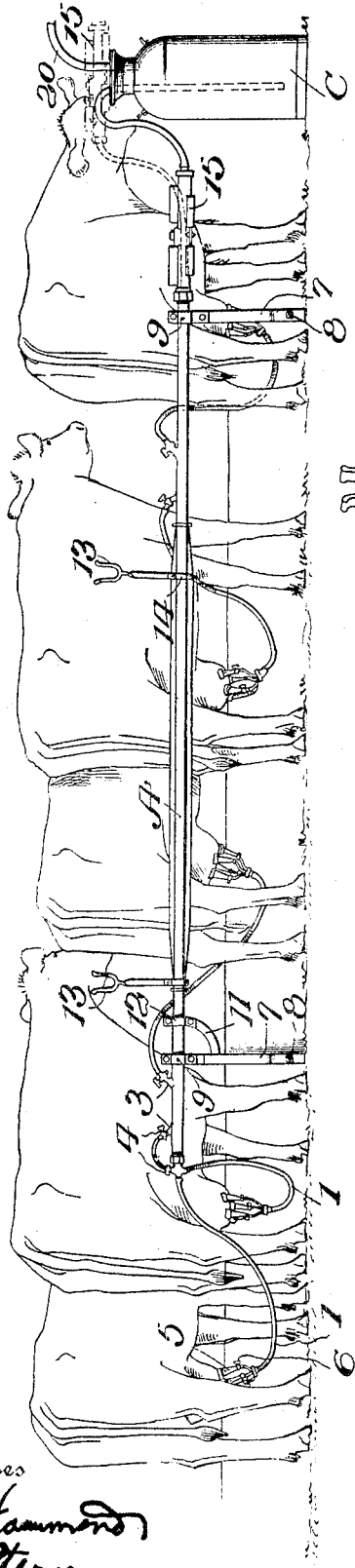

WILLIAM M. MEHRING, OF KEYMAR, MARYLAND.

PORTABLE COW-MILKER.

1,341,430.  Specification of Letters Patent.  Patented May 25, 1920.

Application filed November 25, 1914. Serial No. 873,939.

*To all whom it may concern:*

Be it known that I, WILLIAM M. MEHRING, a citizen of the United States, residing at Keymar, in the county of Carroll and State of Maryland, have invented certain new and useful Improvements in Portable Cow-Milkers, of which the following is a specification.

My invention relates to an improvement in portable cow-milkers, the purpose being to provide means for milking several cows, three or more, at one time and with the use of a single pulsator, and so arranging and equipping the apparatus that it may be easily shifted and cleaned. Also it saves much piping in the stable, and is therefore economical.

With these objects in view, this invention consists in a pipe with means on which it rests upon the floor or ground, or could be suspended from ceiling or wall, and provided with flexible hose with teat-cups, and provided with valves or cocks to control the flow of milk to the main pipe. The invention further consists in a supplementary extension-pipe with hose connections, making it possible to milk a number of cows more remotely located from the can or receptacle without the necessity of moving the latter.

The invention further consists in certain novel features of construction and combinations of parts, which will be hereinafter described and pointed out in the claims.

In the accompanying drawings:—

Figure 1 is a view in perspective, showing my improved portable apparatus with five cows being milked;

Fig. 2 is a view showing the supplementary extension,

Fig. 3 is a view of one of the legs on which the main pipe is supported; and

Fig. 4 is a view of one of the rests for the support of hose and teat-cups when removed from the cow and not in use.

A, represents the main pipe, which may be braced if desired, as shown, to prevent its bending easily; and 1, 1, are the flexible extension-hose leading from outlets 3, 3, on the main pipe, each of which preferably has a valve or cock 4, and on the outer end each flexible hose is provided with the usual teat-cups 5, 5, for attachment to the cow's udder. The valves or cocks 4 may be omitted, and the teat-cups provided with cocks 6, 6, or their equivalents, or it is possible to use both cocks 4 and 6, if desired.

The pipe A is supported on legs 7, 7, these being of any approved form, preferably A-shaped as shown, braced across at the lower end by the rod or bolt 8, and secured to the pipe at the upper end by embracing clamps 9, 9, and bolts or screws 10, 10. If desired, a lateral arm 11 may be provided also on one of the legs, having a clamp 12 upon the pipe A at a short distance away from the clamp 9 to hold the legs rigidly in place.

At intervals, the forks 13, 13, are mounted on the pipe A by means of clamps 14, 14, and with the upper ends of these forks the hose and cups are adapted to be raised, when not in use, to keep them off the ground. A receptacle, C, of any sort desired, such as a can, may be used to receive the milk.

A pulsator 15 may be coupled directly to the pipe A, as shown at the right-hand end thereof in both Figs. 1 and 2, or might be mounted directly on the can C, if desired, as shown in the dotted lines in Fig. 1.

A supplementary extension-pipe 16, as shown in Fig. 2 is preferably supported on rests 17, 17, to hold it away from the ground, and flexible hose 18, 18, connect the ends of this pipe with the main pipe A at one end, and the can C at the other.

From the foregoing it will be seen that the entire row of cows from three to five or more may be milked simultaneously by the use of a single pump (not shown) through the suction applied to pipe 20, and into a common can C; and instead of the parts being stationary they are all portable; and instead of the pulsator being required for every two cows, a single pulsator will suffice for the entire number; and, by having it located on the pipe or can, it is portable along with the other parts of the apparatus.

Thus is provided an apparatus which will milk a number of cows simultaneously, which is easy to install and milks rapidly, and is easy to move from place to place, as well as being perfectly sanitary, as the straight rigid pipes A and 16 make it perfectly easy to run a swab through to clean them after milking.

Obviously several cans could be used instead of one, but it is perfectly feasible to use a large can and thus save repeated emptying of the latter.

The operation is as follows:—The motor which operates the air pump is started, and the valves on the pipe A are first closed. Then as the apparatus is applied to the cow, the valves connected with the hose and teat-cups are opened, and the suction applied through the pump holds the cups in place. The other cups are placed on in like manner. The suction draws milk from the udder, and the pulsator breaks the vacuum partially, or wholly, as is desired, which relieves the cow of constant suction, and simulates the action of the calf in getting the milk.

When a cow is milked, the valves are closed, and the hose hung upon the hook or fork. When all are milked, the hose is uncoupled from the can, the lid may be removed, and the milk removed, or it may be replaced by another can. When required, the extension-pipe is attached, and the apparatus moved to the next set of cows to be milked.

In small dairies, it may be more convenient not to use an extension-pipe, but to move the can when empty to the next position, and to attach to the vacuum-pipe, which should be placed at convenient points in the stable.

It is evident that more or less slight changes might be made in the form and arrangement of the several parts described without departure from the spirit and scope of my invention, and hence I do not wish to be limited to the exact construction herein set forth, but:—

I claim:

1. A portable cow-milker comprising a one-piece straight portable main pipe, means for supporting the pipe, a receptacle, flexible hose extending from the pipe to the receptacle, teat-cups, and hose extending from the latter to the main pipe.

2. A portable cow-milker comprising a one-piece straight portable main pipe, means for supporting the pipe, a receptacle, flexible hose extending from the pipe to the receptacle, teat-cups, hose extending from the latter to the main pipe, and a pulsator carried by one of said parts for creating a pulsating suction through the main pipe, teat-cups and flexible hose connecting them.

3. A portable cow-milker comprising a one-piece straight portable pipe and can, means for supporting the pipe, a one-piece straight extension pipe, means for supporting same, means connecting the extension pipe with the portable pipe and the latter with said receptacle, teat-cups, hose connecting them with said portable pipe and valves or cocks for controlling the suction and flow of milk.

4. A portable cow-milker comprising a one-piece straight portable pipe and can, a pulsator carried by said pipe, means for supporting the pipe, a milk connection connected between the pulsator and the can, extension-hose, teat-cups, and valves or cocks for controlling the suction and flow of milk.

5. A portable cow-milker comprising a portable rigid pipe, hose-extension carrying teat-cups, and means carried by the portable rigid pipe upon which said teat-cups are adapted to rest.

6. A portable cow-milker comprising a portable rigid pipe, hose-extensions carrying teat-cups and valves or cocks, and means carried by the portable rigid pipe upon which said teat cups are adapted to rest.

7. A portable cow-milker comprising a portable rigid pipe, hose-extensions carrying teat-cups, means carried by the portable rigid pipe upon which said teat cups are adapted to rest, and a pulsator carried by said pipe.

8. A portable cow-milker comprising a portable rigid pipe, hose-extensions carrying teat-cups and valves or cocks, means carried by the portable rigid pipe upon which said teat cups are adapted to rest, and a pulsator carried by said pipe.

9. A portable cow-milker comprising a one-piece straight portable main pipe, a one-piece straight extension pipe, means connecting the latter with the main pipe, hose mounted on said main pipe, teat cups thereon, and valves for said hose.

10. A portable cow-milker comprising a one-piece straight portable main pipe, an extension-pipe, means connecting the latter with the main pipe, and means carried by said pipes on which they are supported, hose mounted on said main pipe, teat cups thereon and valves for said hose.

11. A portable cow-milker comprising a one-piece straight portable main pipe, a one piece straight extension pipe, means connecting the latter with the main pipe, hose mounted on said main pipe, teat cups thereon, valves for said hose, and a single pulsator carried by one of said pipes.

12. A portable cow-milker comprising a one-piece straight portable main pipe, a one-piece straight extension pipe, means connecting the latter with the main pipe, and means carried by said pipes on which the latter are supported, hose mounted on said main pipe, teat cups thereon, valves for said hose, and a single pulsator carried by one of said pipes.

13. A portable cow-milker comprising a portable main pipe, hose connections, teat-cups thereon, valves for said hose connections, means secured on the pipe on which the latter is adapted to rest, and hooks mounted on the pipe for the support of the hose and teat-cups when not in use.

14. In a portable cow-milker, the combination with a portable rigid pipe, legs clamped thereon, and lateral braces extending from the upper part of the legs and lengthwise clamped on the pipe.

15. A portable cow-milker comprising a portable main pipe, extension-hose, teat-cups, and rigid means clamped on the main pipe for carrying the hose and teat-cups.

16. A portable cow-milker comprising a portable main pipe, extension-hose, teat-cups, means on the main pipe for carrying the hose and teat-cups, and means for strengthening the main pipe from bending.

17. A portable cow-milker comprising a portable pipe, hose extensions carrying teat cups, and means carried by the portable pipe upon which said teat cups are adapted to rest.

In testimony whereof I affix my signature in the presence of two witnesses.

WILLIAM M. MEHRING.

Witnesses:
S. RAYMOND SWEENEY,
W. H. B. ANDERS.